Feb. 1, 1966  F. SCHURMANN  3,232,353
DEVICES FOR THINNING PLANTS GROWING IN ROWS
Filed May 14, 1963  2 Sheets-Sheet 1
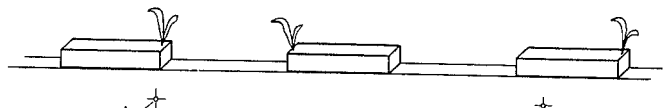
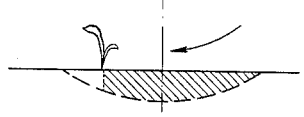
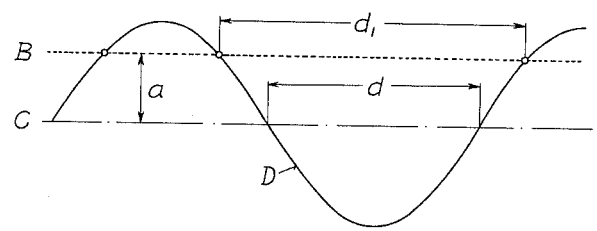
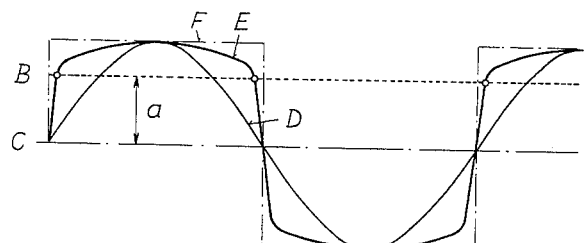
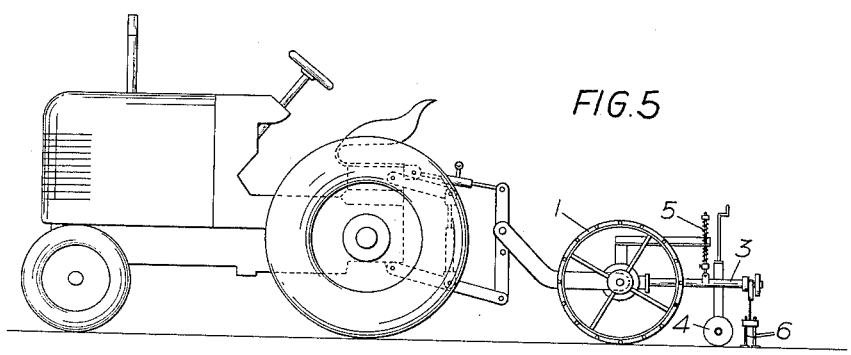

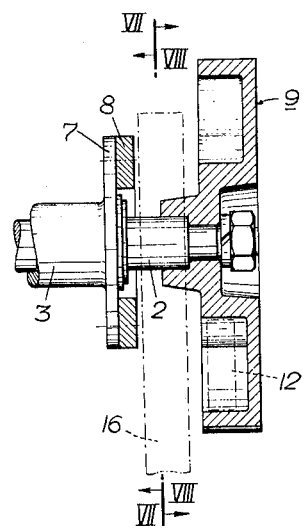
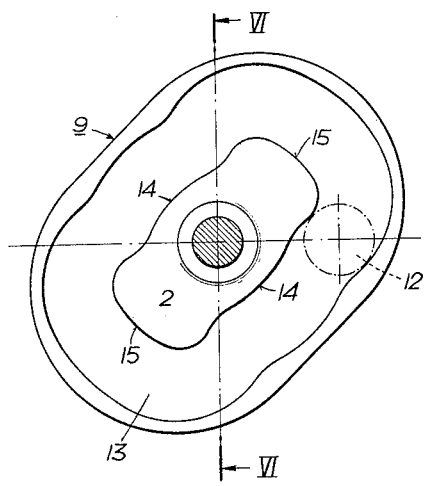
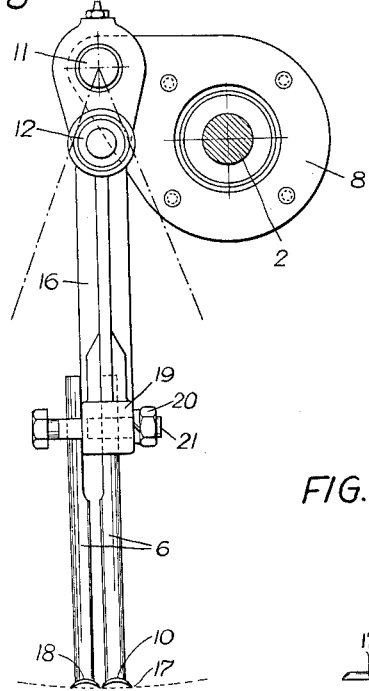
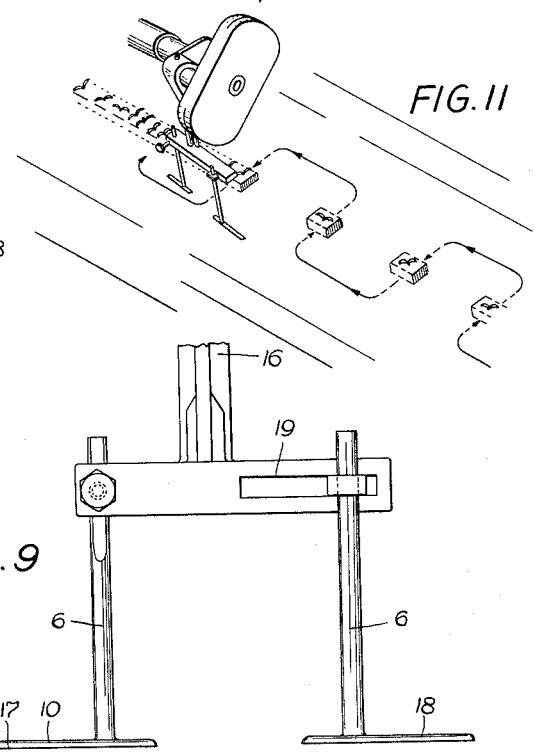

United States Patent Office 3,232,353
Patented Feb. 1, 1966

3,232,353
DEVICES FOR THINNING PLANTS
GROWING IN ROWS
Fritz Schurmann, 9 Fluchtgasse, Vienna, Austria
Filed May 14, 1963, Ser. No. 280,368
Claims priority, application Austria, May 21, 1962,
A 4,169
3 Claims. (Cl. 172—107)

This invention relates to devices for thinning plants growing in rows.

It is an object of the present invention to provide devices of the class referred to which operate to remove excess plants in such a manner as to leave the remaining lands substantially uniformly spaced.

It is another object of the present invention to provide means for operating the cutting elements or knives of plant thinning devices in such a manner as to cause such cutting elements to traverse the respective rows of plants as nearly perpendicularly to the rows as possible.

Still another object of the present invention is the provision of plant thinning devices as aforesaid in which a maximum amount of work may be achieved with the greatest possible economy, employing a minimum number of cutting elements oscillating non-sinusoidally across the respective rows of plants as well as a minimum amount of manual labor.

The foregoing and other objects of the present invention, as well as the characteristics and advantages thereof, will be more clearly understood from the following detailed description of preferred embodiments of the invention when read in conjunction with the accompanying drawings, in which:

FIG. 1 is a diagrammatic representation of the results of a plant thinning operation carried out in accordance with heretofore known techniques;

FIGS. 2 and 3 are graphic illustrations of the effects, on a known plant thinning operation, of the relative non-alignment of a row of plants and the axis of the thinning device;

FIG. 4 illustrates graphically the standard sinusoidal movement of the known plant thinning knives or cutters and the principal disadvantage thereof;

FIG. 5 is a side elevational view of a tractor equipped with a plant thinning device according to the present invention;

FIG. 6 is a fragmentary, partly sectional side elevational view, on an enlarged scale, of the knife-actuating cam means of the device shown in FIG. 5;

FIGS. 7 and 8 are views of the said actuating means taken along the lines VII—VII and VIII—VIII, respectively, in FIG. 6.

FIG. 9 is a side elevational view of a knife assembly for a plant thinning device of the present invention;

FIG. 10 is a graphic comparison of the sinusoidal movement of the knives of known thinning devices with the non-sinusoidal movement of the knives of the device according to this invention to illustrate the principal advantage thereof; and FIG. 11 is a perspective diagrammatic illustration of lands set with plants and of the operation of the device according to the present invention on a row of plants.

Devices for thinning plants growing in rows are known, which devices are provided with tools consisting of knives which rotate transversely to the rows or reciprocate. The rotary knives are driven from the ground wheels by means of a bevel gearing and a working shaft, which extends in the direction of travel of the machine. One machine comprises a plurality of such devices extending parallel to each other and corresponding in number to the number of parallel rows of plants to be worked upon at the same time, in most cases five or six. Before the use of the knives, which are mounted in a starlike arrangement on a hub, a rotary star set with spring knives is used in most cases. This star has a brushlike action and is used mainly for a biological purpose of loosening the soil in the row of beets and to remove crusts of soil, weeds, as well as plants which are weak or have weak roots. The actual thinning work is subsequently performed with two different cutters set with different knives, for instance, with 8 wide knives or with 16 narrow knives, the work being thus performed in two operations as illustrated in the diagram shown in FIG. 1 of the accompanying drawings. As is apparent from this figure, plants may be left in the lands at the adjacent or opposite ends thereof. This results in different distances, which may vary between 45 and 135 millimeters after the use of the cutter having 8 knives.

The irregular pattern of plants obtained after the use of the cutter having 8 knives may then be individually worked upon by hand to eliminate the individual plants spaced too closely apart as well as the plants which are present in excess, so as to obtain the required average spacing of 250 millimeters. In this case, the preceding mechanical thinning serves for reducing the expensive manual labor. Alternatively, the plants are mechanically thinned with the second cutter, which has 16 narrow knives, to obtain the desired final average spacing. This leaves still closely adjacent plants, so-called double beets, and there are often excessively large distances, which means missing plants, so that the work of the machine does not achieve the quantity of the manual work and a correction of the field by manual work is still required.

In this practice, an adaptation to the initial pattern, which is suitably obtained with a single-grain seeder, is possible by the selection of knives of different width. For this purpose, the plants which have grown from the seeds must be counted before being thinned and the width of the knives must be selected accordingly. Hence, the machine must be supplied with at least three sets of knives of different width for the cutter having 16 knives and one set of knives for the cutter having 8 knives, totalling 56 knives per row.

Besides, the tractor must move exactly along the rows of plants to achieve satisfactory results. In most cases, the thinning machine towed by the tractor must be additionally steered by a separate operator (operation with a team of two).

The axis of rotation of the knives should be correctly adjusted to the row of plants in accordance with FIG. 3. The knives rotating in the clockwise sense move along an arc of a circle through the soil. The plant should be disposed in the right-hand third of the arc described by the knives so that the axis A of the thinning device should be disposed on the left of the plant. On the other hand, if the axis of rotation A is on the right of the row of plants, as is shown in FIG. 2, the movement of soil in the wide strip indicated by hatching results in an inaccurate cut and the plants may be covered or the roots may be exposed, depending on the soil structure.

The cutting speed and the width of cut of the rotary knives are not changed even in the case of a deviation from the correct position with respect to the row. In thinning machines having reciprocating (oscillating) knives, the cutting speed and the width of the lands are variable in the case of an inaccurate positioning with respect to the row of plants.

These last-mentioned machines, however, can be substantially simplified in another respect. Instead of 8 or 16 rotary knives, only one or two knives arranged one behind the other are required to achieve the same effect, if the knives perform the same number of cuts as the rotary knives. Because the oscillating knife is pulled through the row, the number of oscillations of one oscillating knife must be four times the number of revolutions of the rotary cutter in order to obtain the same effect as with eight rotary knives. All previously known thinning machines having an oscillating knife are driven from the take-off shaft of the tractor whereas thinning machines having rotary knives are driven by the ground wheels. For this reason, the tractor must always be driven with the same gear when towing a machine having oscillating knives. Because the ratio of the speed of the take-off shaft to the output speed of the gearbox varies with different tractors, the drive of the thinning machine must be adapted to that of the tractor being used, which is undesirable.

Known thinning machines having an oscillating mechanism are driven by means of a crank. The reciprocating movement of the knives and the rectilinear movement of the machine result in a movement of the knives along a sine curve, which results in important disadvantages (see FIG. 4). The oscillating knife will operate properly only when the row of plants and the axis of the sine curve coincide. In case of deviation, for instance, when the line of plants B is spaced apart from the axis C of the sine curve by a distance $a$, the distance between lands will change from $d$ to $d_1$ and the speed of the knife will also vary. Because the machine cannot be steered with sufficient accuracy, a change of the distance between lands due to inaccurate steering will result in changing distances between plants and the change in the cutting speed will result in an excessive movement of soil so that an exact cut will not be obtained.

This is where the invention comes in. The device according to the invention for thinning plants grown in rows is of that known type in which the thinning tool is driven by a rotary shaft extending in the direction of travel. According to the invention, there are provided at least one knife which oscillates transversely to the row of plants about a fixed point, which is eccentric with respect to the axis of the drive shaft, and a camwheel mounted on the drive shaft and preferably provided with a cam slot and in direct engagement with the knife to produce the oscillating motion thereof.

In a specific embodiment of the device according to the invention, the oscillating knife may be pivotally mounted on the end flange of a carrying tube, which surrounds the rotary shaft, and the knife may have a fingerlike projection or the like, e.g. a pin or a roller, which engages a groove formed in the camwheel.

It is further proposed to form the eccentric wheel with a groove which is symmetric with respect to the main axis of the camwheel so that the groove has at least two mutually opposite points close to the axis and at least two mutually opposite points remote from the axis. To enable a change of the width of the land, it is suitable to provide two knives, which are arranged one beside the other or one above the other and are relatively adjustable in the longitudinal direction of the cutting edges. It may be stated in general that the cam should be designed to impart to the knife a movement at a maximum uniform velocity along a straight line which is only minimally oblique or preferably as nearly as possible at right angles to the direction of travel.

Finally, the cam may be designed to cause during one revolution of the shaft more than two oscillations of the knives and is provided for this purpose along the cam path with more than two mutually opposite points close to the axis and with more than two mutually opposite points remote from the axis. By the use of a double cam, the distance between blocks may be doubled, e.g., increased to 180 millimeters.

The invention teaches a new method of fully mechanically singling plants grown in rows, which method helps to avoid the disadvantages of the previous methods, such as excessively large movements of the soil so as to cover the plants, a great variation of the spacing resulting in "double beets," on the one hand, and missing plants, on the other hand.

An illustrative embodiment of the device according to the invention will now be explained more fully with reference to FIGS. 5 to 11 of the accompanying drawings.

The device shown in FIG. 5 has ground wheels 1, which drive the working shaft 2 (FIG. 6), extending in the direction of travel, by a bevel gearing, not shown. The shaft 2 is mounted in a carrying tube 3, which is supported on the ground in known manner by means of a pressure wheel 4. Springs 5 cause the thinning device to be forced against the ground with the required pressure to ensure the desired penetration of the tools 6.

At its rear end, the carrying tube 3 has a flange 7, which has a bracket 8 screwed to it and which may serve in a manner known per se for the attachment of a single-grain seeder. The rear end of the working shaft 2 extends through the flange 7 and has a camwheel 9 keyed to it. An arm 16 which carries a cutting blade assembly 10, 18 is pivoted by a pin 11 to the bracket 8 at a point which is eccentric with respect to the working shaft 2. Below the pin 11, the arm 16 carries a cam follower roller 12, which engages a cam groove 13 in the camwheel 9. In lieu of a roller, of course, the cam follower may be a pin or other fingerlike element. As is apparent from FIG. 7, the groove is designed to have two mutually opposite points 14 close to the axis and two points 15 remote from the axis. The position of the roller 12 indicated by dash-and-dot lines corresponds to the vertical position of the blade assembly when it just traverses the row of plants. During one rotation of the camwheel 9, the blade assembly is oscillated twice about its pivot 11. Alternatively, the camwheel 9 may be designed to provide for several oscillations of the blade assembly during one revolution of the camwheel. By the use of a fourfold cam, the effect of a cutter having eight blades can be obtained in an improved manner with only one oscillating blade and that of a cutter having 16 blades with two oscillating blades.

The blade assembly shown is composite and, as has been mentioned, comprises a double blade assembly. Each individual blade 10 or 18 is forged from a round steel bar and is angled in its lower part to form a T flange extending in the direction of travel of the machine. It is apparent that two cutting edges 17 are provided, which extend in the direction of travel during operation. This portion of the blade is approximately crescent-shaped in cross-section.

To enable a variation of the width of the cut, the blade 18, which is arranged in a guide slot 19 to extend parallel to the first blade 10, is displaced to the desired position after the nut 20 on the bolt 21 in this slot has been loosened. The blade is then fixed in its adjusted position.

The arrangement thus is such that one part of each oscillatory movement is carried out at a relatively high speed, while another part is carried out at a relatively low speed. More specifically, it is the movement of the knife or knives during the cutting part of each stroke, i.e. shortly after the reversal of the direction of oscillatory movement, which is effected at a maximum velocity when the cam follower 12 is passing over either of the points 15 of the cam. The resultant line of cut is, therefore, as nearly perpendicular to the row of plants (or to the line of travel of the device) as possible, since the difference between the speed of the ground wheel 1 of the device along the row of plants and the speed of movement of the knife or knives across the row of plants is at a minimum.

In FIG. 10, the sine curve D corresponds to the path of movement of the blade of a previously usual thinner provided with a crank drive of a blade (see also FIG. 4). Line E corresponds to the path of movement of the blade according to the invention (see also FIG. 11). It is apparent that a deviation of the working plane (axis C) of the oscillating blade according to the invention, for instance, by the distance $a$ from the row of plants B, will not result in a substantial change in the distance between the lands. F indicates the ideal path of the oscillating blade, which cannot be achieved in practice. The blade according to the invention moves substantially at a uniform velocity in the range $a$ on both sides of the axis C.

On the other hand, with the usual oscillating blade driven by a crank, the velocity and the distance between lands vary greatly in case of a deviation from the axis C.

The path of the blades described hereinbefore during thinning and the uniformity of the velocity depend on the shape of the cam or of the groove in the camwheel. This shape may be determined by calculation or empirically by moving the blades at a uniform speed along the desired path and observing the movement of the roller 12, which describes the contour of the cam.

What is claimed is:

1. A plant thinning device of the character described comprising an elongated longitudinally disposed tubular support which is adapted to have the forward end thereof connected to a towing vehicle, a shaft which is rotatably mounted in said support with the rear end thereof extending out beyond the rear end of said support, means through which said shaft is rotated by the movement of said vehicle, a bracket which is secured to the rear end of said support and extends transversely outwardly therefrom, a vertically disposed arm having the upper end thereof pivotally connected to the free end of said bracket for transverse oscillation with respect to said support, plant cutting means secured to the lower end of said arm, a cam means secured to the rear end of said shaft for rotation therewith, a cam follower carried by said arm below said pivotal connection in operative engagement with said cam means through which said cam means is adapted to oscillate said arm and the cutting means carried thereby, said cam means being provided with an endless cam groove into which said cam follower extends, said cam groove being symmetrical about a longitudinally extending axial plane and about a transversely extending axial plane, with the longitudinal extent of said groove being greater than the transverse extent thereof.

2. A plant thinning device as defined by claim 1 in which said cutting means comprises a horizontally disposed blade carrier secured to the lower end of said arm, a pair of spaced blades secured to said carrier for vertical adjustment with respect thereto with the cutting edges of said blades being disposed parallel to said shaft.

3. A plant thinning device as defined by claim 2 in which said blades are laterally adjustable with respect to each other.

References Cited by the Examiner

UNITED STATES PATENTS

| | | | |
|---|---|---|---|
| 955,085 | 4/1910 | Lang | 172—107 |
| 1,029,282 | 6/1912 | Fargason | 172—107 |
| 1,331,148 | 2/1920 | Gwin | 172—107 |
| 1,503,626 | 8/1924 | Belsley | 172—54 |
| 2,470,766 | 5/1949 | Durning. | |
| 2,533,094 | 12/1950 | Cooper | 74—54 |
| 2,713,816 | 7/1955 | Berg | 172—97 |
| 2,980,190 | 4/1961 | Hannagan | 172—97 |

FOREIGN PATENTS

| | | |
|---|---|---|
| 272,999 | 4/1914 | Germany. |
| 16,838 | 7/1907 | Great Britain. |

ABRAHAM G. STONE, *Primary Examiner.*